United States Patent Office
2,716,692
Patented Aug. 30, 1955

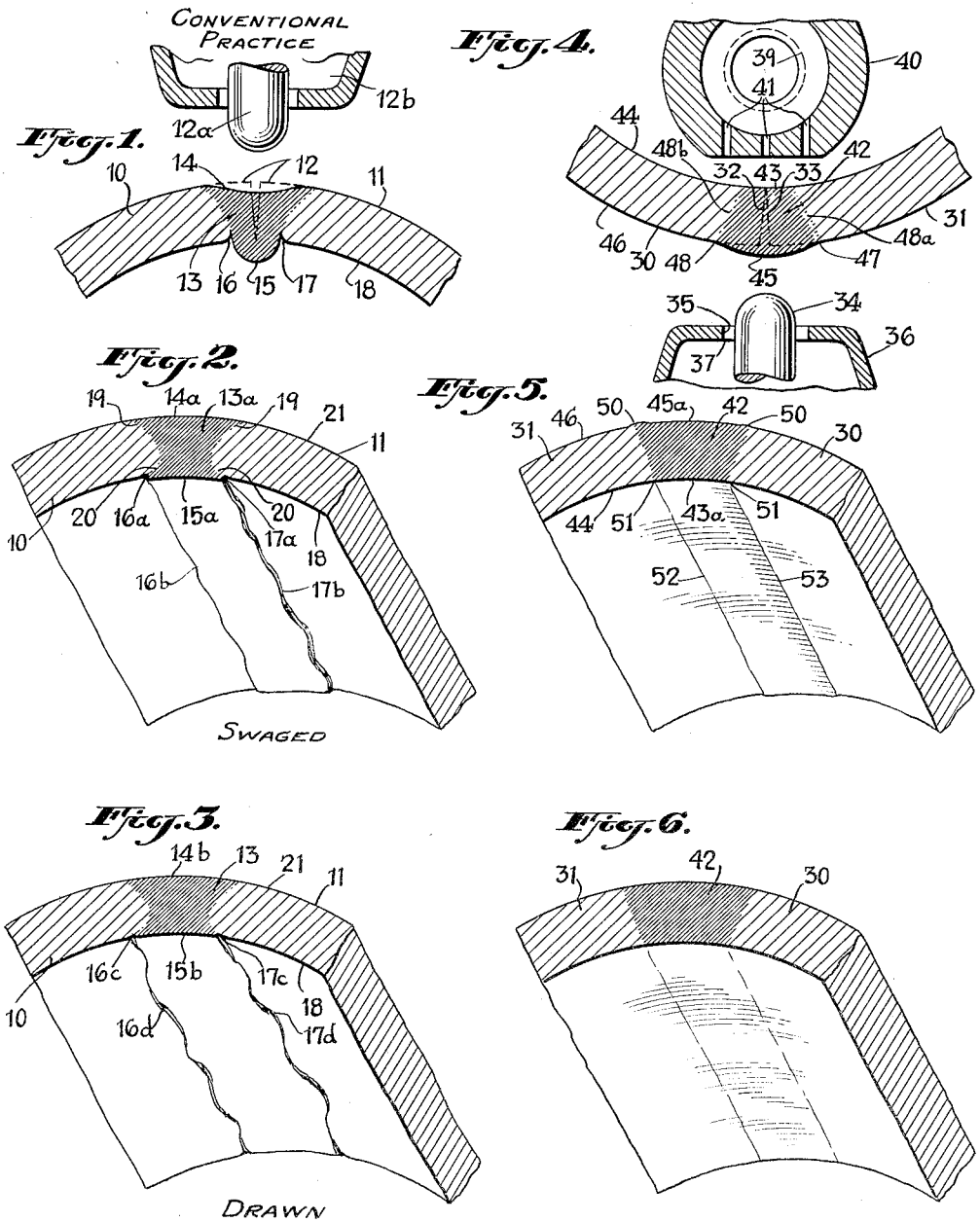

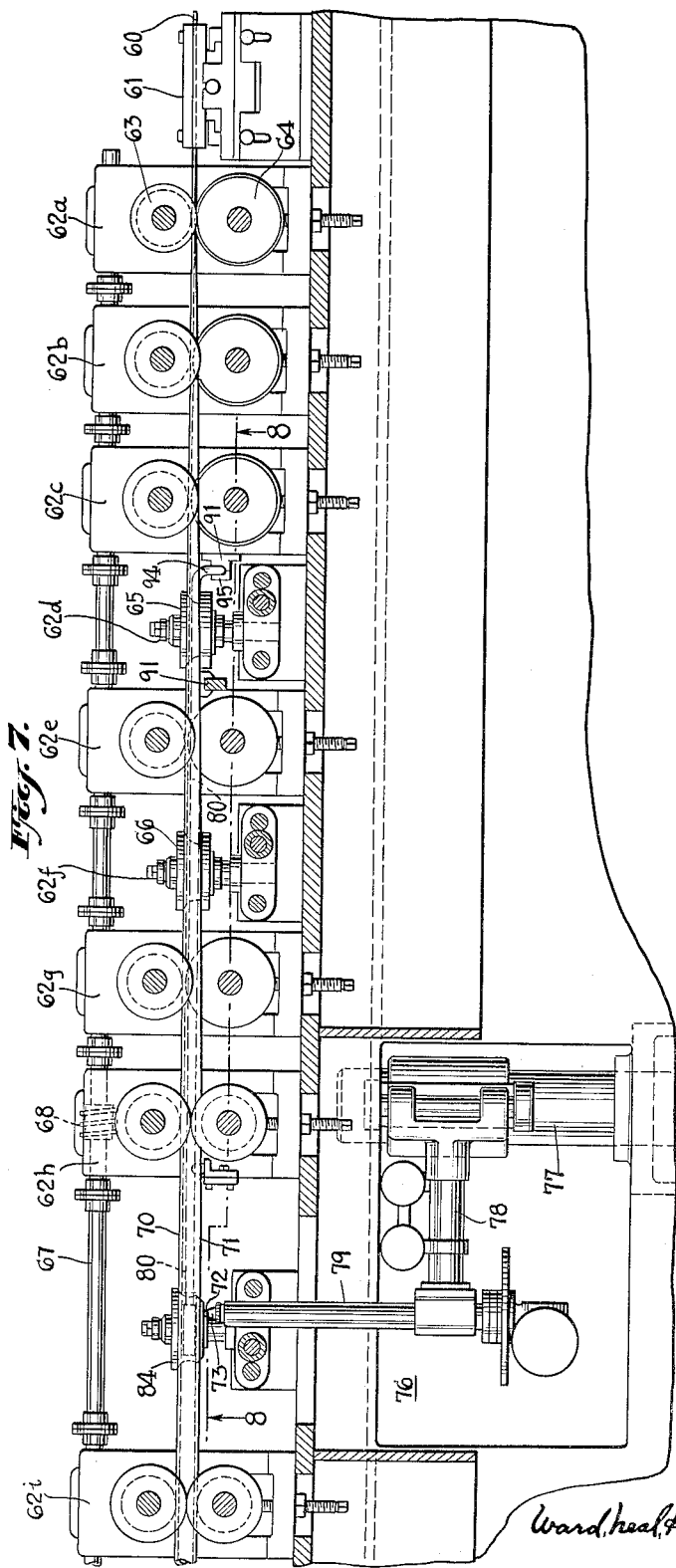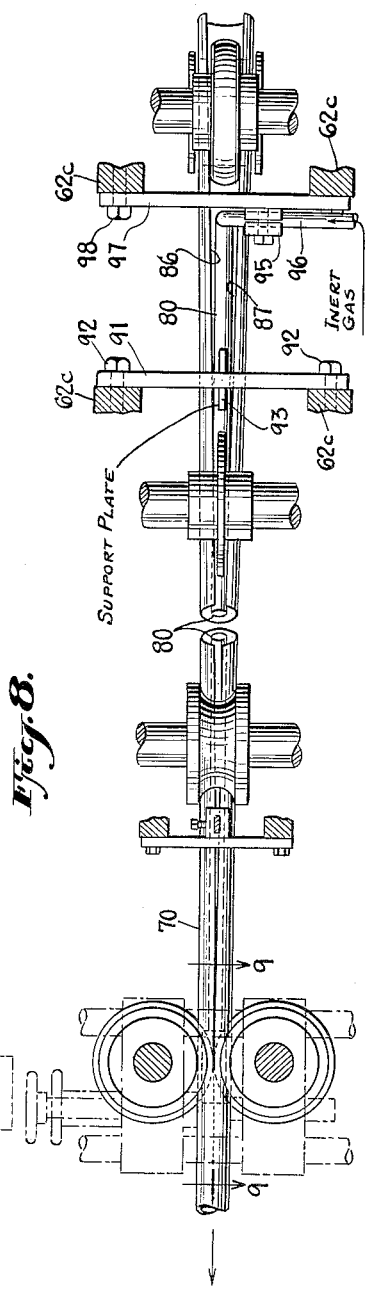

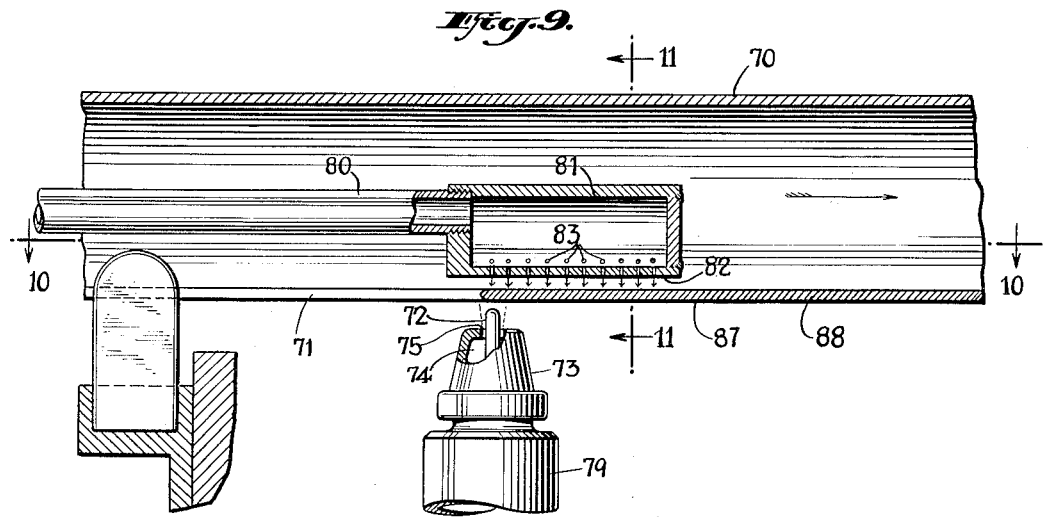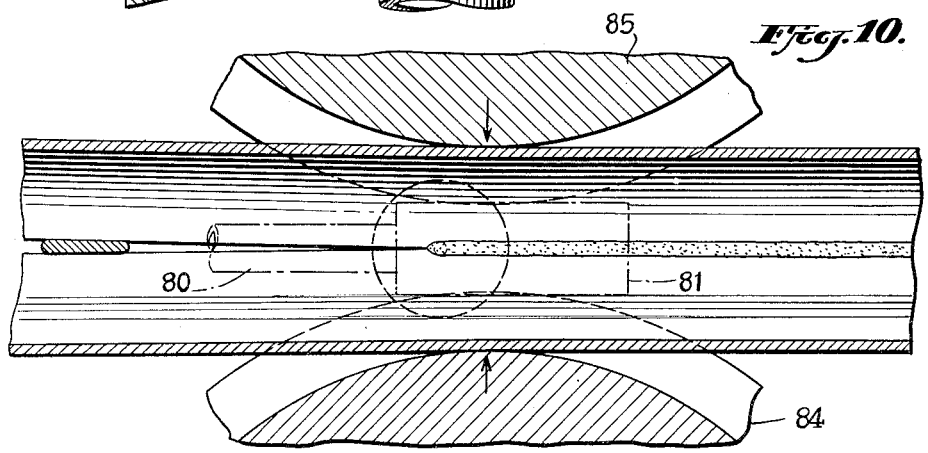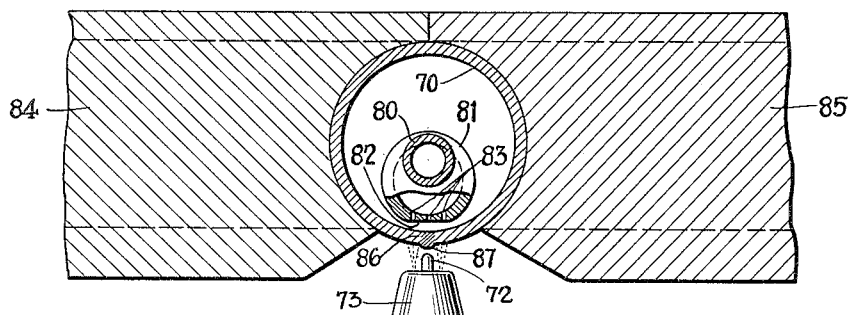

2,716,692
METHODS FOR PRODUCING WELDED SEAM TUBING

Elmer W. Williams, Muskego, and Howard J. Bowman, East Troy, Wis., assignors to Trent Tube Company, East Troy, Wis., a corporation of Wisconsin Application February 16, 1954, Serial No. 410,680

6 Claims. (Cl. 219—10)

This invention pertains to improvements in methods and apparatus for the production of welded seam tubing, and more especially to such improvements as applied to the contactual, inert-gas-shielded, arc welding of tubing composed of corrosion resisting or stainless metals and alloys, such as the various austenitic stainless steels, the high nickel alloys, titanium and its alloys, etc.

The conventional method of producing relatively thin walled welded seam tubing of the types aforesaid, consists in forming initially flat metal strip into tubular form by feeding through a series of horizontally aligned and appropriately contoured pairs of forming rolls until a circular section is obtained with the opposite edges of the strip abutting at the top of the tubing in a more or less V-shaped seam. Thereupon the thus formed tubular stock is fed under an arc welding unit mounted above the tubing and carrying an electrode which projects downwardly above the seam of the tubing. An arc is struck so that as the tubular stock is fed progressively past and beneath the electrode, the arc melts and fuses together the abutting edges of the seam into a continuous weld joint. During the welding the arc and portion of the tubing being welded is enveloped in an inert atmosphere of helium or the like fed under pressure from a nozzle surrounding the arc and directed downwardly onto the tubing at the weld point.

The weld produced in this way is subject to contour irregularities. On the exterior of the tubing, the weld seam is concave in cross section, while on the tubing interior, it is convex or crowned in cross section, and forms a rib projecting radially inward toward the tube axis and extending along the weld seam in more or less irregular or meandering fashion. This sectional contour of the weld is apparently due to the action of gravity causing a sagging of the metal rendered molten whereby concave and convex sectional curvatures are imparted to the weld joint exteriorly and interiorly, respectively of the tubing. In addition to this, the molten metal on cooling contracts and draws away from the contiguous inner surface portions of the tubing, thus producing grooves which are recessed radially below the arcuate contour of the inner surface of the tubing, these grooves extending more or less irregularly longitudinally along the opposite sides of the inner crowned or ribbed portions of the weld joint. These grooves are highly objectionable in that they cannot be completely removed by subsequent finishing operations, such as swaging and/or drawing. They thus remain in the finished tube as clearly visible defects productive of flaws in production and of contamination, corrosion and possible failure in use.

We propose in accordance with the present invention not only to eliminate these defects resulting from the conventional practice aforesaid, but in addition, to provide novel methods and apparatus for so forming and welding the tubing as to produce a weld joint which in the "as welded" condition, is substantially flawless throughout its length and breadth, as well as flush with the inner tube wall and free from recessing, and which on the tube exterior is of slightly crowned configuration in cross section and joined without recessing to the contiguous portions of the outer tube wall. The resulting weld joint on subsequent finishing of the tubing as aforesaid, is scarcely visible as a weld seam so smoothly and flawlessly does it coalesce with the adjacent tube portions. In cross section the weld seam is straight-sided in conformity with a true annular sector. Likewise the weld joint is straight-sided longitudinally of the tubing, the junction between the weld zone and the parent metal being uniformly blended.

In accordance with the basic concept of the invention these improvements are achieved by welding the tubing in inverted relation as compared to conventional practice, and such that the abutting tube edges are disposed below rather than above the horizontal tube diameter or midsection and welded by a welding electrode mounted below the centerline of the tube seam and directed upwardly toward the same. The welding is carried out in an atmosphere of an inert gas such as helium, argon, etc., supplied under pressure both interiorly and exteriorly of the tubing at the zone of welding. Preferably the tube edges are brought into abutment at the extreme base or lowermost portion of the tubing, and the welding effected by an arc electrode mounted beneath the tubing, and pointing upwardly toward the tube seam substantially in the vertical axial plane of the tubing, which also includes the tube seam. The advantages of the invention are, however, obtained in varying degree at other positionings of the tube seam and welding electrode below the horizontal tube midsection.

For purposes of welding as aforesaid, the tubing may be formed in the conventional manner, i. e., with the seam at the top, and after cutting to length, the resulting tube sections may be disposed with the seam at the base and fed thus between squeeze rolls and over an arc electrode disposed below the seam, thus to weld the tubing in the inverted relation aforesaid. Preferably, however, the tubing is so formed in the manner explained below, that the opposite edges are brought to abutment below the horizontal midsection, preferably at the tube base, and the tubing fed thence over an arc electrode and between squeeze rolls as above outlined.

Having thus described the invention in general terms, reference will now be had for a more detailed description to the accompanying drawings wherein:

Figs. 1–3, inc., are schematic views illustrative of the conventional welding practice above described, and the resulting appearance of the weld joint "as welded" and after subsequent finishing operations by swaging and by drawing, Fig. 1 being a fragmentary showing of a transverse section through the weld joint, and illustrating the relative positioning of the tube seam and the welding electrode disposed above the same for forming a weld by conventional practice. Fig. 2 is a fragmentary perspective view of the welded section of Fig. 1 after swaging; while Fig. 3 is a fragmentary perspective view corresponding to Fig. 2 after the subsequent drawing of the tubing.

Figs. 4–6, inc., are schematic views corresponding to Figs. 1–3, inc., but illustrative of welding in accordance with the present invention and the appearance of the weld seam on subsequent swaging and drawing operations. Fig. 4 is a fragmentary transverse section through the weld joint after forming the weld by a welding electrode disposed beneath the same. Fig. 5 is a fragmentary perspective view showing the weld joint after swaging and Fig. 6 is a corresponding view showing the weld joint after subsequent drawing of the tube.

Fig. 7 is a view in side elevation of a preferred embodiment of the tube forming and welding apparatus in accordance with the present invention, for progressively forming the tubing from continuous strip and for progressively welding the same as the tube seam passes over the welding electrode. Fig. 8 is a fragmentary plan view of the apparatus of Fig. 1, as taken substantially at 8—8 of Fig. 7. Fig. 9 is an enlarged fragmentary sectional elevation as taken substantially at 9—9 of Fig. 8, showing the welding assembly, exteriorly and interiorly of the tubing. Fig. 10 is a fragmentary sectional plan view of the Fig. 9 showing as taken substantially at 10—10 of Fig. 9. Fig. 11 is a transverse vertical section of the Fig. 9 assembly as taken substantially at 11—11 thereof.

Referring to Fig. 1, there is shown the opposite edges 10, 11 of a fragmentary section of tubing formed by conventional practices wherein the tube edges are brought to abutment at the top of the tubing in a substantially V-shaped seam, as at 12, and welded thereat by a welding unit mounted above the tubing and carrying a welding electrode 12a directed vertically downward as shown above the seam 12. The resulting weld joint 13 has in transverse section, as above stated, a slightly concave or sagging contour 14 on the tube exterior, and a crowned or beaded configuration 15 on the tube interior. As the metal rendered molten by the welding arc, cools and solidifies, it shrinks away from the contiguous portions of the tubing interior, due to surface tension effects, in the manner shown at 16 and 17, to provide tension effects, in the manner shown at 16 and 17, to provide grooves extending along the opposite sides of the inner weld bead 15, which grooves 16, 17 are recessed radially below the inner arcuate contour 18 of the tubing.

On subsequent swaging of the tubing, the weld joint 13 has imparted thereto the configuration shown at 13a in Fig. 2. In transverse section the weld joint is flared out adjacent the inner and outer tube contiguous surfaces in the manner shown at 19 and 20. On the tube exterior the weld joint is substantially flush with the outer arcuate contour 21 of the tubing as at 14a. On the tube interior, the initially crowned bead 15, Fig. 1, of the weld joint, has now been flattened out in the manner shown at 15a, Fig. 2. But the recessed grooves 16, 17, Fig. 1, between the weld joint and the contiguous tube portions, are still present, after swaging, as clearly visible grooves recessed radially below the inner arcuate contour 18 of the tubing as at 16a, 17a, of Fig. 2, and extend longitudinally of the tubing in more or less irregular fashion along the opposite sides of the weld joint in the manner shown at 16b, 17b.

When now the tubing swaged as in Fig. 2, is subsequently drawn as by pulling through a drawing die and over a drawing mandrel, the latter disposed on the tube interior, the tubing has the appearance shown in Fig. 3. On the tube exterior the weld joint 13 is substantially flush as at 14b with the outer arcuate contour 21 of the tubing. Also on the tube interior the weld joint is substantially flush as at 15b, with the inner arcuate contour 18 of the tubing. However, the recessed portions 16a, 17a, Fig. 2, are still present as clearly visible grooves, recessed radially below the inner arcuate contour 18 of the tubing, as at 16c, 17c, which extend irregularly along the opposite sides of the weld joint as at 16d, 17d.

Referring now to Fig. 4 illustrative of the welding procedure in accordance with the present invention, the tubing is formed in inverted relation as compared to the Fig. 1 procedure, so that the tube edges 30, 31 are brought to abutment on the underside or lowermost portion of the tubing in the manner illustrated by the dotted lines 32, 33, thereby providing a seam of substantially inverted V-shaped configuration in transverse section, and which extends longitudinally of the tubing. The welding unit is mounted beneath this seam with the arc electrode 34 extending vertically upward in substantial alignment with and slightly spaced from the seam 32, 33. The welding electrode 34 extends through a circular aperture 35 of a housing 36, the aperture 35 being of somewhat greater diameter than that of the welding electrode 34 thus to provide an annular space therebetween as at 37 through which, during the welding, an inert gas such as helium is forced outwardly and upwardly under pressure against the tube seam 32, 33 and contiguous tube portions 30, 31. Also mounted on the end of a supply pipe 39, extending along the tube interior, is a drum-like chamber member 40 provided with jet openings, as at 41, through which, during the welding, an inert gas, such as helium, is directed downwardly under pressure in alignment with the welding electrode, and against the interior of the tube seam 32, 33 and contiguous portions of the tubing 30, 31.

As a result of this arrangement a weld joint is produced having substantially the configuration shown by the darkly shaded area 42. On the tube interior this weld joint is formed substantially flush, as at 43, with the inner arcuate contour 44 of the tube. On the tube exterior the weld joint is slightly crowned or convex as at 45, and joins flush and without recessing as at 47 to the contiguous tube portions 30, 31 along the outer arcuate contour 46 thereof. It will further be noted that the sides of the weld joint are substantially straight as at 48a, 48b, so that the interior weld joint 42 has in transverse section approximately a trapezoidal configuration.

After swaging, the weld joint has the configuration illustrated in Fig. 5, wherein both the inner and outer surfaces thereof are arcuately contoured as at 43a, 45a in conformity with the inner and outer arcuate contours 44, 46 respectively of the tubing proper. Also the inner and outer surface portions of the weld 43a, 45a of the weld joint form smooth and unrecessed junctions with the contiguous parent metal of the tubing as at 50, 51. Also the weld joint extends longitudinally along the tubing in a seam which is scarcely distinguishable from the tubing proper, in substantially rectilinear fashion as at 52, 53. On subsequent drawing of the tubing, the weld joint 42 is caused even more smoothly to coalesce with the contiguous tube portions 30, 31, in a seam which is even less distinguishable from the balance of the tubing, as shown.

Comparing the welding arrangements of Figs. 1 and 4, it will be seen that with the conventional practice of Fig. 1 wherein the opposite edges of the strip are brought to abutment at the top of the tubing, the seam is of upright V shape, whereas in the modification of Fig. 4, wherein the strip edges are brought to abutment at the bottom of the tubing, the seam is of inverted V shape. Since in the upright V seam of Fig. 1, the spacing between the strip edges is greatest at the top, the zone of metal fused by the arc tends to sag under gravity at the top of the weld joint and to flow out at the bottom in the form of a bead as shown. On the other hand, with the inverted V seam of Fig. 4, the space between the strip edges is greatest at the base, these edges being in substantial contact at the top of the seam. Accordingly, there is little or no tendency for the fused metal to sag at the top of the joint, and such slight sagging as may occur, simply conforms the inner surface of the weld joint with the concave inner arcuate contour of the tubing.

On the tube exterior in the Fig. 4 modification, the crowned or convex contour of the weld joint is desirable because it permits reduction of cross section which will break up the dendritic or cast structure resulting in a desirable recrystallization of weldment after annealing. The reduction of cross section or breaking up of the dendritic or cast structure is accomplished by the finishing operation, such as swaging, drawing, rolling down, tube reducing, etc.

A further important advantage of the welding arrangement of Fig. 4 as compared to the conventional practice of Fig. 1 is the following. In the conventional practice of Fig. 1, outgassing of the tubular stock rendered molten by the arc, in escaping from the upper surface of the weld, flows upward directly against the arc and thus causes the arc to vary in intensity, and in some instances to become completely extinguished momentarily. This results in a weld joint of variable width as shown in Fig. 2, and in one which is apt to contain discontinuities due to the aforesaid occasional substantial or complete extinction of the arc. In contrast to this, in the Fig. 4 modification wherein the arc is disposed below the tube seam, such outgassing of the weld joint as occurs on the lower surface 45 of the weld joint flows upwards around the tubular stock and away from the arc, while such outgassing as occurs on the interior side of the weld joint as at 43, obviously has no effect on the arc, since it occurs on the interior of the tubing, which thus protects the arc from such outgassing. The result is an extremely stable arc productive of the uniform weld joint illustrated in Fig. 5.

A still further advantage of the Fig. 4 modification as compared to Fig. 1 is this. It will be noted in the Fig. 1 modification wherein the welding electrode is disposed above the weld seam, the inert atmosphere of helium or the like must be directed downwardly against the weld seam, since this gas is supplied under pressure from the housing 12b surrounding the arc. As soon as the gas is released from the housing 12b, however, it tends to flow upward away from the arc, and thus makes it difficult to maintain the arc and weld joint completely shielded at all times in the atmosphere of the inert gas. With the arrangement of Fig. 4, on the other hand, wherein the arc is disposed below the tube seam, the inert gas supplied from housing 36 flows upwardly toward the weld joint and thence around the exterior sides of the tubing, thus greatly facilitating the retention of the inert atmosphere enveloping the arc and weld joint.

With reference to Fig. 4, the interior surface 43 of the weld seam can, if desired, be made slightly convex by suitably adjusting the pressure of the squeeze rolls through which the tubular stock passes substantially at the weld joint as explained below. Also the seam of this inner surface can be controlled by surface tension effects. Ordinarily the inert atmosphere of helium or the like supplied to this surface of the weld joint from the chamber 40 will provide adequate surface tension to shape the inner surface as at 43. It has been found, however, that the inclusion in the atmosphere of inert gas supplied from chamber 40 of a trace of oxygen, greatly increases the surface tension effect, so that this together with the normal shrinkage of the weld joint on cooling flattens out the inner surface of the weld joint in the manner shown.

Reference will now be had to Figs. 7–11, inc., illustrative of a complete assembly of tube forming and welding apparatus in accordance with the invention, for converting flat metal strip into tubular form, with the seam on the under side thereof, and for welding the seam as formed in the manner aforesaid. In this embodiment the flat metal strip 60 enters the apparatus at the right as shown, being fed, for example, from a reel thereof, the strip passing thence through a flattening guide 61, and thence through a succession of forming roll stands, as at 62a–62h, inc., each mounting a pair of oppositely disposed forming rolls, certain of which are mounted on horizontal axes as at 63, 64, and others of which are mounted on vertical axes as, for example, at 65, 66. In this apparatus the upper rolls such as 63 of the vertical stands 62a, b, c, e, g and h, are driven, by means of a drive shaft 67, and through the intermediary of worms as at 68 mounted thereon which mesh with worm gear wheels mounted in the housings 62a–h, inc., respectively, these drives being of conventional construction and hence requiring no detailed description.

As the initially flat strip 60 is fed progressively through these forming rolls, the opposite edges of the strip are curved gradually downward and thence inward toward each other, until the opposite edges abut to form tubing as at 70, having the seam of abutting edges along the lower side thereof as at 71. The so formed tubing is fed thence under a welding electrode 72, mounted in a housing 73, similar to that illustrated in Fig. 4, this housing being of hollow construction as shown at 74, Fig. 9, and being provided with a circular opening 75 through which the welding electrode 72 extends in spaced relation, whereby an inert gas such as helium is forced out under pressure from the housing interior and through the annular opening between the housing and the electrode, being directed thence upwardly against the under side of the tubing at the weld juncture.

The welding unit shown generally at 73 is of more or less conventional construction for producing an inert-gas-shielded arc. It comprises in its essentials a vertical support 77, on which is mounted an offset arm 78, on which in turn is vertically mounted a tubular electrode holder 79, which terminates in the housing 73 aforesaid, for directing about the non-consumable electrode 72, of thoriated tungsten or the like, a shielding blanket or atmosphere of an inert gas, such as argon, helium, etc.

Mounted on the end of an inert gas supply pipe 80, extending along the tube interior, Figs. 9–11, inc., is a gas outlet chamber 81, Figs. 9–11, inc., of elongated drum-like configuration as shown, this chamber being flattened on its lower side as at 82, and penetrated by a series of jet openings, as at 83, whereby inert gas supplied under pressure over line 80 and to the interior chamber 81 is forced downwardly and outwardly under pressure through the jet openings 83, and against the tube seam 71 and adjacent tube portions in a region above the welding electrode 72.

Substantially at the point that the welding electrode is positioned, the tubing 70 passes between a pair of squeeze rolls 84, 85, which force together the abutting tube edges 86, 87, Fig. 11, to form the finished weld joint 88, having the configuration shown in transverse section at 42 of Fig. 4.

The positioning of the welding electrode 72 is adjustable longitudinally along the tube seam, toward or away from the point of contact of the squeeze rolls 84, 85, in accordance with the speed of feed of the tubular stock as well as in accordance with the wall thickness thereof and the type of material being welded. This adjustment is effected on an empirical basis until a weld joint is obtained having the configuration in transverse section illustrated at 42 in Fig. 4. The maximum distance of adjustment for such purposes between the position of the welding electrode and the squeeze point of rolls 84, 85, is ordinarily never more than about one-quarter to one-half inch.

The supply pipe 80, which mounts the gas orifice chamber 81, extends within the tubing 70 back along the same from the welding point, to a point between the roll stands 62c and 62e, at which the opposite edges 86, 87 of the metal strip are sufficiently flared apart, to permit mounting and exit of the supply pipe 80. To this end a pipe supporting member 91 is bolted as at 92 to one side of the roll housing 62c, this support 91 having projecting downwardly therefrom as viewed in Fig. 8 a supporting flange 93 which is welded at its lower end to the supply pipe 80.

The pipe 80 extends thence beyond the support 91, to a point adjacent the opposed side of the housing 62c, being bent downwardly thereat as at 94, Fig. 7, through the flared opening 86, 87 of the tubing, and being secured thereat to the side of the housing 62c by means of a clamp 95, at which point a flexible hoseline 96 for supplying the inert gas, is telescoped onto the terminus of the pipe section. As shown in Fig. 8 the clamp 95 is adjustably bolted to a strap 97, which extends under the tubing 70 and is bolted as at 98 at its opposite ends to the housing 62c.

Reverting to Fig. 7, after the tubing passes beyond the welding unit 79 and between the squeeze rolls 84, 85, it is fed thence through a final driven rollstand 62i for propelling the finished and welded pipe to a shearing mechanism for cutting the same into pipe sections of suitable length in conventional fashion.

The present invention is particularly adapted to the welding of relatively thick-walled stock on the order of about 3/32" to 3/16". It is also particularly adapted, as above stated, to the welding of the various stainless and corrosion resisting steels and alloys such as the various austenitic chromium-nickel steels containing chromium within the range of about 17–25% and nickel within the range of about 8–35%, both the low carbon grades containing 0.03% carbon maximum and the higher carbon grades containing up to 0.07% carbon maximum or even up to 0.15%, with and without additions of other elements such as small amounts of columbium, molybdenum, etc. It is also adapted to the welding of the high nickel alloys, such as Inconel containing about 15% chromium and 75–80% nickel, or Incalloy containing about 20% chromium and 30% nickel, high nickel-chrome-cobalt alloys, such as N–155, S–816, S–590, S–588, etc., also the various grades of Hastalloy, as well as such metals as titanium, zirconium and alloys of each which are highly susceptible to atmospheric contamination and scaling.

Again reverting to Fig. 7, the invention is not restricted to the use of a single arc welding electrode disposed as at 72, but also contemplates the use of two or more such electrodes disposed seriatum along the weld seam and sufficiently apart, i. e., a matter of a few inches, to permit substantial solidification of the weld metal between arcs.

Referring to Figs. 4 and 7, by appropriately adjusting the pressure of the squeeze rolls 84, 85, the outer sectional contour 45 of the weld 42, may be made arcuately crowned as shown, or may be made to conform substantially to the arcuate outer contour 46 of the tubing proper.

In the appended claims the expression "finishing" is meant to embrace any of the following operations or combinations thereof, i. e., swaging, drawing, rolling down, tube reducing or equivalent manipulations.

What is claimed is:

1. The method of welding metal tubing formed with a longitudinally extending seam of abutting edges, which comprises: disposing said tubing with said seam below the horizontal midsection of the tubing, and while so disposed, progressively feeding the same past an arc electrode disposed below the centerline of said seam, while energizing said electrode to fusion arc weld said abutting edges together, and concurrently applying sufficient squeezing pressure to said abutting edges to impart to the resulting weld joint an inner surface substantially flush with the inner arcuate contour of the tubing, and to impart to the outer surface of the weld joint a substantially convex arcuate configuration in transverse section.

2. The method of welding metal tubing formed with a longitudinally extending seam of abutting edges, which comprises: disposing said tubing with said seam below the horizontal midsection of the tubing, and while so disposed, progressively feeding the same past an arc electrode disposed below the centerline of said seam, while energizing said electrode to fusion arc weld said abutting edges together, and during said welding, immersing said arc and the portion of said tubing being welded in an atmosphere of an inert gas both exteriorly and interiorly of the tubing, thereby to prevent atmospheric contamination and scaling of the inner and outer heated surfaces of the tubing, and concurrently applying sufficient squeezing pressure to said abutting edges to impart to the resulting weld joint an inner surface substantially flush with the inner arcuate contour of the tubing, and to impart to the outer surface of the weld joint a substantially convex arcuate contour in transverse section.

3. The method of producing welded tubing from elongated metal strip, which comprises: continuously feeding said strip in the direction of its length while progressively cold forming the same into tubular configuration until the opposite edges converge into abutment to form a longitudinally extending seam disposed below the horizontal midsection of said tubing, and while so disposed, progressively feeding the tubing past an arc electrode disposed below the centerline of said seam, while energizing said electrode to fusion arc weld said abutting edges together, and during said welding, immersing said arc and the portion of said tubing being welded in an atmosphere of an inert gas both exteriorly and interiorly of the tubing, thereby to prevent atmospheric contamination and scaling of the inner and outer heated surfaces of the tubing, and concurrently applying sufficient squeezing pressure to said abutting edges to impart to the resulting weld joint an inner surface substantially flush with the inner arcuate contour of the tubing, and to impart to the outer surface of the weld joint a substantially convex arcuate contour in transverse section.

4. The method of welding metal tubing formed with a longitudinally extending seam of abutting edges, which comprises: disposing said tubing with said seam below the horizontal midsection of the tubing and with said abutting edges in a substantially vertical plane, and while so disposed, progressively feeding the same past an arc electrode disposed below the centerline of said seam, while energizing said electrode to fusion arc weld said abutting edges together, and concurrently applying sufficient squeezing pressure to said abutting edges to impart to the resulting weld joint an inner surface substantially flush with the inner arcuate contour of the tubing, and to impart to the outer surface of the weld joint a substantially convex arcuate configuration in transverse section.

5. The method of welding metal tubing formed with a longitudinally extending seam of abutting edges, which comprises: disposing said tubing with said seam below the horizontal midsection of the tubing and with said abutting edges in a substantially vertical plane, and while so disposed, progressively feeding the same past an arc electrode disposed below the centerline of said seam, while energizing said electrode to fusion arc weld said abutting edges together, and during said welding, immersing said arc and the portion of said tubing being welded in an atmosphere of an inert gas both exteriorly and interiorly of the tubing, thereby to prevent atmospheric contamination and scaling of the inner and outer heated surfaces of the tubing, and concurrently applying sufficient squeezing pressure to said abutting edges to impart to the resulting weld joint an inner surface substantially flush with the inner arcuate contour of the tubing, and to impart to the outer surface of the weld joint a substantially convex arcuate contour in transverse section.

6. The method of producing welded tubing from elongated metal strip, which comprises: continuously feeding said strip in the direction of its length while progressively cold forming the same into tubular configuration until the opposite edges converge into abutment to form a longitudinally extending seam disposed below the horizontal midsection of said tubing and with said abutting edges in a substantially vertical plane, and while so disposed, progressively feeding the tubing past an arc electrode disposed below the centerline of said seam, while energizing said electrode to fusion arc weld said abutting edges together, and during said welding, immersing said arc and the portion of said tubing being welded in an atmosphere of an inert gas both exteriorly and interiorly of the tubing, thereby to prevent atmospheric contamination and scaling of the inner and outer heated surfaces of the tubing, and concurrently applying sufficient squeezing pressure to said abutting edges to impart to the resulting weld joint an inner surface substantially flush with the inner arcuate contour of the tubing, and to impart to the outer surface of the weld joint a substantially convex arcuate contour in transverse section.

References Cited in the file of this patent

UNITED STATES PATENTS

| Number | Name | Date |
| --- | --- | --- |
| 1,435,751 | Stearns | Nov. 14, 1922 |
| 1,917,210 | Adams | July 4, 1933 |
| 2,644,070 | Herbst | June 30, 1953 |
| 2,654,014 | Schaefer | Sept. 29, 1953 |
| 2,659,966 | Turnbull | Nov. 24, 1953 |
| 2,669,639 | Bowman | Feb. 16, 1954 |